(12) United States Patent
Arkas et al.

(10) Patent No.: US 8,039,732 B2
(45) Date of Patent: Oct. 18, 2011

(54) SOLAR ENERGY TRAP

(76) Inventors: Evangelos Arkas, London (GB); Nicholas Arkas, London (GB)

( * ) Notice: Subject to any disclaimer, the term of this patent is extended or adjusted under 35 U.S.C. 154(b) by 221 days.

(21) Appl. No.: 11/660,876

(22) PCT Filed: Aug. 17, 2005

(86) PCT No.: PCT/GB2005/003220
§ 371 (c)(1), (2), (4) Date: Sep. 27, 2007

(87) PCT Pub. No.: WO2006/021752
PCT Pub. Date: Mar. 2, 2006

(65) Prior Publication Data
US 2008/0066800 A1    Mar. 20, 2008

(30) Foreign Application Priority Data
Aug. 23, 2004   (GB) .................................. 0418778.7

(51) Int. Cl.
*H01L 31/058* (2006.01)
(52) U.S. Cl. ....................... 136/248; 136/244
(58) Field of Classification Search ........... 136/243–252
See application file for complete search history.

(56) References Cited

U.S. PATENT DOCUMENTS

| | | | |
|---|---|---|---|
| 3,923,381 A * | 12/1975 | Winston | 359/852 |
| 4,088,116 A * | 5/1978 | Pastor | 126/677 |
| 4,147,415 A | 4/1979 | Dolan et al. | |
| 4,313,024 A | 1/1982 | Horne | |
| 4,397,152 A | 8/1983 | Smith et al. | |
| 4,815,443 A | 3/1989 | Vrolyk et al. | |
| 5,005,360 A | 4/1991 | McMurtry et al. | |
| 5,421,322 A | 6/1995 | Karni et al. | |
| 6,747,572 B2 * | 6/2004 | Bocko et al. | 340/870.16 |
| 2003/0185955 A1 * | 10/2003 | Ghosh et al. | 426/534 |
| 2004/0079358 A1 | 4/2004 | Arkas et al. | |
| 2005/0019578 A1 * | 1/2005 | Bosteels | 428/408 |
| 2006/0231132 A1 * | 10/2006 | Neussner | 136/244 |
| 2008/0256953 A1 * | 10/2008 | Arkas et al. | 60/641.8 |

FOREIGN PATENT DOCUMENTS

| | | |
|---|---|---|
| DE | 2834826 | 2/1980 |
| DE | 19725023 | 6/1997 |
| DE | 102004038321 | 6/2005 |
| GB | 1 514 929 | 6/1978 |
| GB | 2343741 | 5/2000 |
| JP | 57019549 | 2/1982 |
| JP | 06-018097 * | 1/1994 |
| JP | 06018097 | 1/1994 |

* cited by examiner

*Primary Examiner* — Jennifer Michener
*Assistant Examiner* — Jayne Mershon
(74) *Attorney, Agent, or Firm* — Seyfarth Shaw LLP

(57) ABSTRACT

A solar energy trap (10) includes a chamber (11) having inlet post (12), such that solar energy (13) entering the chamber (11) through the inlet port (12) is absorbed and reflected within the chamber (11) means until substantially all the solar energy (13) is absorbed by the chamber (11). Preferably, the inlet port (12) is arranged to cause photons of the solar energy (13) entering the chamber (11) to circulate substantially in a single direction within the chamber (11) until absorbed, such that on re-passing the inlet port (12) substantially no photons emerge from the inlet port (12).

12 Claims, 4 Drawing Sheets

SOLAR ENERGY TRAP

This invention relates to a solar energy trap and a method of trapping solar energy.

Solar radiation has a spectral, or wavelength, distribution from short wavelength radiation, gamma and X-rays, to long wavelength radiation, long radio waves. The different regions of the solar spectrum can be described by the range of their wavelengths. The combined radiation in the wavelength region from 280 nm to 4,000 nm is called the broadband, or total, solar radiation. About 99 percent of solar radiation is contained in the wavelength region from 300 nm to 3,000 nm. The visible spectrum extends from ultraviolet, about 390 nm, to near-infrared, 780 nm, and makes up only about 10 percent of the total solar spectrum. A peak in the solar spectrum occurs at 560 nm. The colour temperature of the solar spectrum varies between 3000 K and 3500 K with latitude.

It is difficult to utilise the full spectrum. For example, with parabolic reflector solar collectors, much of the solar energy is reflected back into space. Moreover, photovoltaic devices, used to convert solar energy, have a peak sensitivity at approximately 830 nm and only 14-16% of the collected energy is converted. Focussing the sun's rays using a multiplicity of mirrors to heat a liquid also results in much of the energy being reflected back into space.

It is an object of the present invention at least to ameliorate the aforesaid disadvantages in the prior art.

According to a first aspect of the invention, there is provided a solar energy trap comprising chamber means defining an internal volume, the chamber means having inlet port means communicating with the internal volume, such that solar energy entering the chamber means through the inlet port means is absorbed and reflected within the chamber means until substantially all the solar energy is absorbed by the chamber means.

Preferably, the inlet port means is arranged to cause photons of the solar energy entering the chamber means to circulate substantially in a single direction within the chamber means until absorbed, such that on re-passing the inlet port means substantially no photons emerge from the inlet port means.

Advantageously, photovoltaic cell means are located on internal walls of the chamber means for converting at least some of the solar energy to electricity.

Advantageously, thermovoltaic cell means are located on internal walls of the chamber means for converting at least some of the solar energy to electricity.

Preferably, the solar energy trap includes temperature control means for maintaining a predetermined temperature differential across the photovoltaic cell means and/or thermovoltaic cell means for substantially maximum working efficiency thereof.

Conveniently, the solar energy trap further comprises heat exchanger means for extracting heat energy from the chamber means.

Advantageously, the heat exchanger means comprises jacket means located around at least a portion of the chamber means.

Conveniently, the chamber means is enclosed in pressurised vessel means for generation of high-grade steam.

Advantageously, the solar energy trap further comprises electric generator means for using the high-grade steam for generating electricity.

Advantageously, the chamber means is of a re-circulating serpentine shape.

Conveniently, the chamber means comprises a plurality of elongate portions joined serially at alternate ends to neighbouring elongate portions by semicircular portions, a first of the plurality of elongate portions being joined to a serially last of the elongate portions by a U-shaped portion, to form a re-circulating chamber means.

Alternatively, the chamber means is a re-circulating coil.

Preferably, the inlet port means comprises inlet tube means communicating with the internal volume.

Advantageously, a longitudinal axis of the inlet tube means is inclined at an acute internal angle to a longitudinal axis of an elongate portion of the chamber means.

Conveniently, the chamber means has a circular transverse cross-section.

Alternatively, the chamber means has a polygonal transverse cross-section.

Advantageously, the chamber means has one of a square, an octagonal and a triangular transverse cross-section.

Advantageously, the chamber means comprises hinged panel means to form a wall of the chamber means on which photovoltaic cells means and/or thermovoltaic cell means are located to form an inner surface of the chamber means.

Conveniently, the solar energy trap is adapted for incineration of waste material.

Alternatively, the solar energy trap is adapted for cremation of bodies.

Conveniently, the solar energy trap comprises incineration vessel means located within the chamber means for containing material or a body to be incinerated.

Preferably, the incineration vessel means comprises at least one of temperature control means and pressure control means.

Conveniently, the chamber means is of one or more of metal, metal alloy and ceramic material.

Advantageously, the chamber means is of titanium-tungsten internally lined with high-temperature ceramic material.

Conveniently, the solar energy trap comprises gas handling means for providing an inert gas environment within the chamber means.

According to a second aspect of the invention, there is provided a method of trapping solar energy comprising the steps of: providing chamber means defining an internal volume; providing inlet port means communicating with the internal volume; and admitting solar energy through the inlet port means into the internal volume such that the solar energy is absorbed and repeatedly reflected within the chamber means until substantially all the solar energy is absorbed by the chamber means.

Preferably, the step of admitting solar energy through the inlet port means comprises causing photons of the solar energy entering the chamber means to circulate substantially in a single direction within the chamber means until absorbed, such that on re-passing the inlet port means substantially no photons emerge from the entry port.

Advantageously, the method comprises a further step of providing photovoltaic cell means located on internal walls of the chamber means and converting at least some of the solar energy to electricity therewith.

Advantageously, the method comprises a further step of providing thermovoltaic cell means located on internal walls of the chamber means and converting at least some of the solar energy to electricity therewith.

Preferably, the method includes further steps of providing temperature control means and thereby maintaining a predetermined temperature differential across the photovoltaic cell means and/or thermovoltaic cell means for substantially maximum working efficiency thereof.

Advantageously, the method further comprises steps of providing heat exchanger means and extracting heat energy from the chamber means therewith.

Advantageously, the step of providing heat exchanger means comprises providing jacket means located around at least a portion of the chamber means.

Conveniently, the method comprises further steps of providing pressurised vessel means enclosing the chamber means and of generating high-grade steam therein.

Advantageously, the method comprises further steps of providing electric generator means and of using the high-grade steam for generating electricity thereby.

Conveniently, the method includes a further step of incinerating waste material with the trapped solar energy.

Conveniently, the method includes a further step of cremating bodies with the trapped solar energy.

Advantageously, the method includes a further step of providing incineration vessel means within the chamber means for containing material or bodies to be incinerated.

Advantageously, the method comprises a further step of providing gas handling means and providing an inert gas environment within the chamber means therewith.

The invention will now be described, by way of example, with reference to the accompanying drawings in which.

In the Figures, like reference numbers denote like parts.

Figure 1:
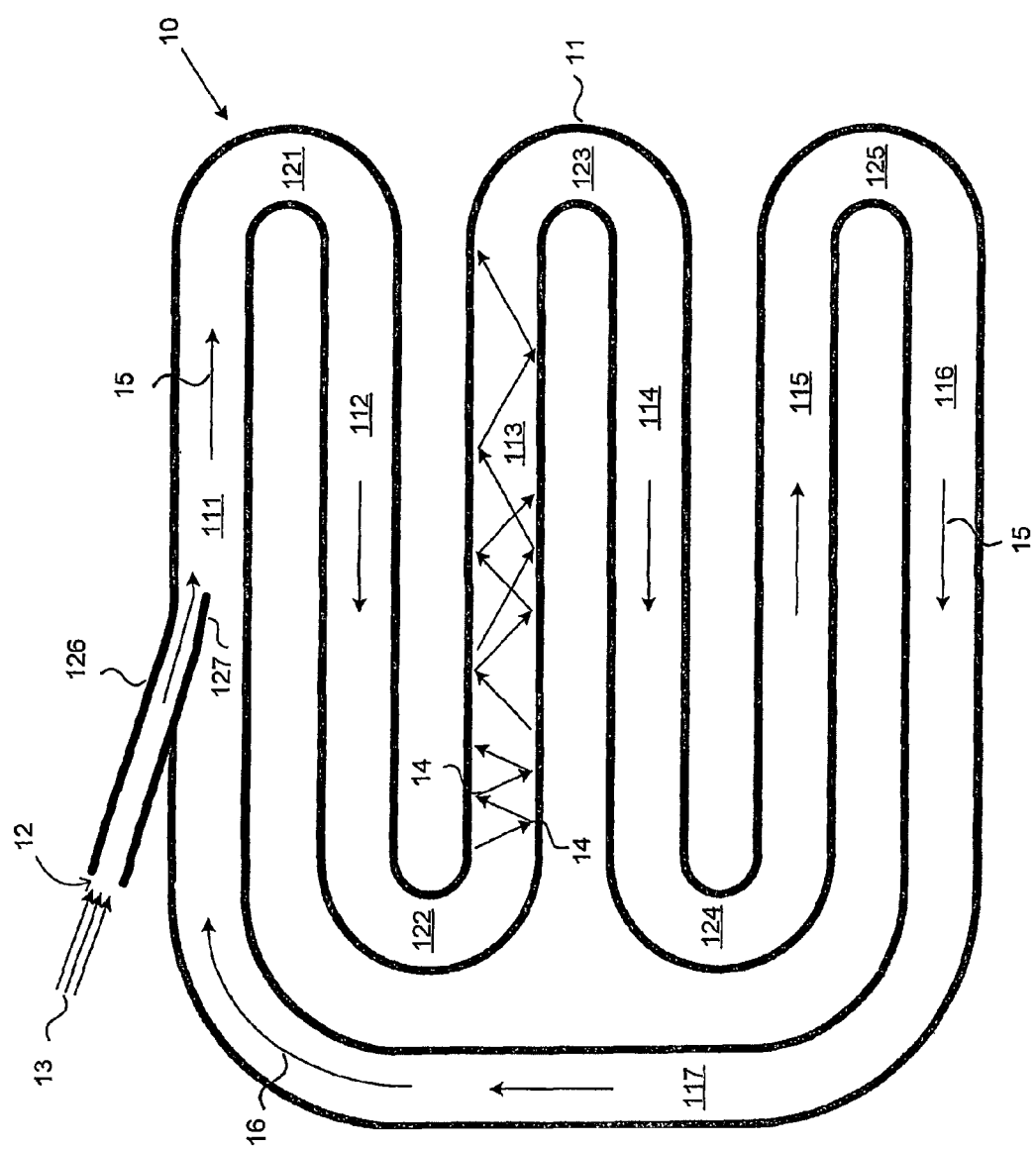
FIG. 1 is a schematic cross-sectional diagram of a first embodiment of a solar energy trap according to the invention.

A first embodiment of a solar energy trap 10 according to the invention, illustrated in FIG. 1, includes a closed serpentine chamber 11 with an inlet port 12. The closed serpentine chamber is formed of six parallel hollow elongate tubular portions, a first elongate portion 111 is joined to an adjacent second elongate portion 112 by a first semicircular tubular portion 121 at a first end of the second elongate portion 112 and the second elongate portion 112 is joined to a third elongate portion 113 at a second end of the second elongate portion opposed to the first end by a second semicircular portion 122. Similarly, the third elongate portion 113 is joined at a first end by a third semicircular portion 123 to a first end of a fourth elongate portion 114. Similarly, the fourth elongate portion 114 is joined at a second end opposed to the first end by a fourth semicircular portion 124 to a fifth elongate portion 115. Similarly, the fifth elongate portion 115 is joined at a first end by a fifth semicircular portion 125 to a first end of a sixth elongate portion 116. The sixth elongate portion 116 is joined at a second end opposed to the first end by a U-shaped portion 117 to a second end on the first elongate portion 111 to form the closed serpentine chamber 11.

The inlet port 12 is formed by an inlet tube 126, of smaller cross-sectional diameter than portions of the serpentine chamber 11, and located approximately central of the first elongate portion 111, has a longitudinal axis at a first acute included angle to a longitudinal axis of the first elongate portion 111. A portion 127 of the inlet tube protruding into the first elongate portion 111 is inclined at a second acute included angle to a longitudinal axis of the first elongate portion 111 smaller than the first acute included angle.

Although the solar energy trap has been described as having a closed serpentine chamber 11, other forms of closed chamber with an inlet port may be used. For example, the closed chamber may be a coil with a first end of the coil joined to an opposed second end thereof. Alternatively, an annular doughnut closed chamber may be used. In a simplest embodiment, the solar energy trap may be a closed box with an opening to admit solar energy, such that substantially all of the admitted solar energy is absorbed within the box.

Photovoltaic cells, with a peak sensitivity of substantially 830 nm, and/or thermovoltaic cells with a peak sensitivity of substantially 950 nm may be located on internal surfaces of the closed chamber. Cooling of the external surfaces of the closed chamber may be applied to maintain an optimal temperature differential across the photovoltaic cells and/or thermovoltaic cells corresponding to a peak yield of the cells. A suitable temperature to maintain one side of photovoltaic cells is at substantially 25° C., whereas thermovoltaic cells can operate between 50° C. and 400° C. Such cooling may be carried out by, for example, air flows or by water-based heat exchangers.

Figure 4:
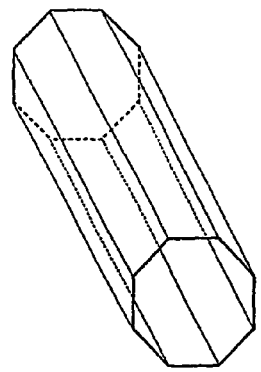
FIG. 4 is a perspective view of a tubular section of a variation of the solar energy trap of FIG. 1, having an octagonal transverse cross-section.
Figure 5:
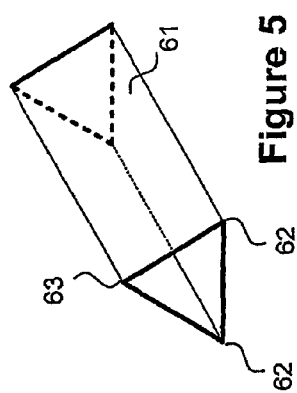
FIG. 5 is a perspective view of a tubular section of a variation of the solar energy trap of FIG. 1, having an equilateral triangular transverse cross-section.
Figure 3:
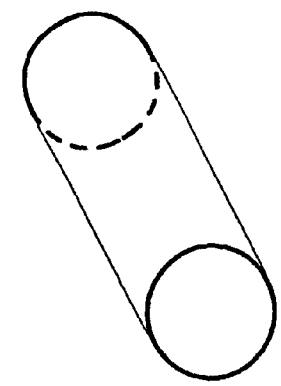
FIG. 3 is a perspective view of a tubular section of the solar energy trap of FIG. 1, having a circular transverse cross-section.
Figure 6:
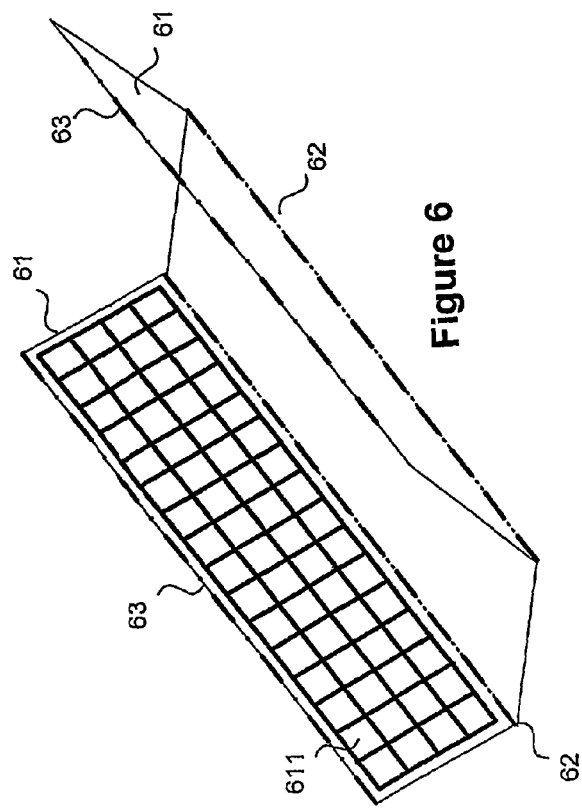
FIG. 6 is a perspective view of the tubular section of FIG. 5, in which panels forming two sides of the section are hinged to a third side and one panel is illustrated as being provided with photovoltaic or thermovoltaic devices.
Figure 2:
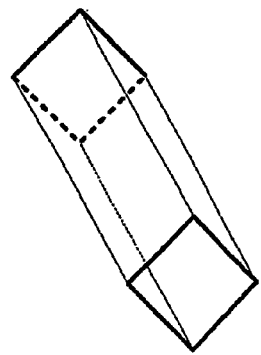
FIG. 2 is a perspective view of a tubular section of a variation of the solar energy trap of FIG. 1, having a square transverse cross-section.

The transverse cross-section of the sealed chamber may be, for example, a square as shown in FIG. 2, a circle as shown in FIG. 3, an octagon as shown in FIG. 4 or an equilateral triangle as shown in FIG. 5. Alternatively, any other transverse polygonal cross-section may be used. As illustrated for a triangular cross-section in FIG. 6, at least in the case of chambers made up from planar rectangular plates, adjacent planar plates 61 may be hinged along their long edges 62 to adjacent plates at all vertices except one, and be joinable at the remaining vertex 63, so that the chamber portion may be opened for, for example, inspection and maintenance. The flat panels also facilitate the use of planar photocells 611, whereas thin film cells may be used with circular or other cross-sections where the chamber does not include planar panels. Where the chamber has a polygonal cross-section, the connecting portions may be angular portions rather than arcuate portions as described above.

In use, substantially collimated solar energy 13, collected and directed by any method, enters the inlet port 12 and circulates around the closed chamber 11 by multiple reflections 14 from internal surfaces of the chamber. The inclination of the inlet port tube causes photons of the solar energy to circulate in a single direction, as shown by arrow-headed lines 15, around the serpentine chamber, such that on re-passing the inlet port substantially no unabsorbed photons issue from the chamber through the inlet port. That is, substantially all solar energy, of all wavelengths, once it has entered the inlet port remains in the closed chamber and is absorbed by the internal walls or cells located on the internal walls. That is, there is substantially a one-direction flow of photons, as shown by arcuate arrow-headed line 16, around the chamber.

Photons reflected from the internal walls or cells may lose energy in each reflection or absorption, so that the energy of even high-energy photons is eventually absorbed.

Figure 7:
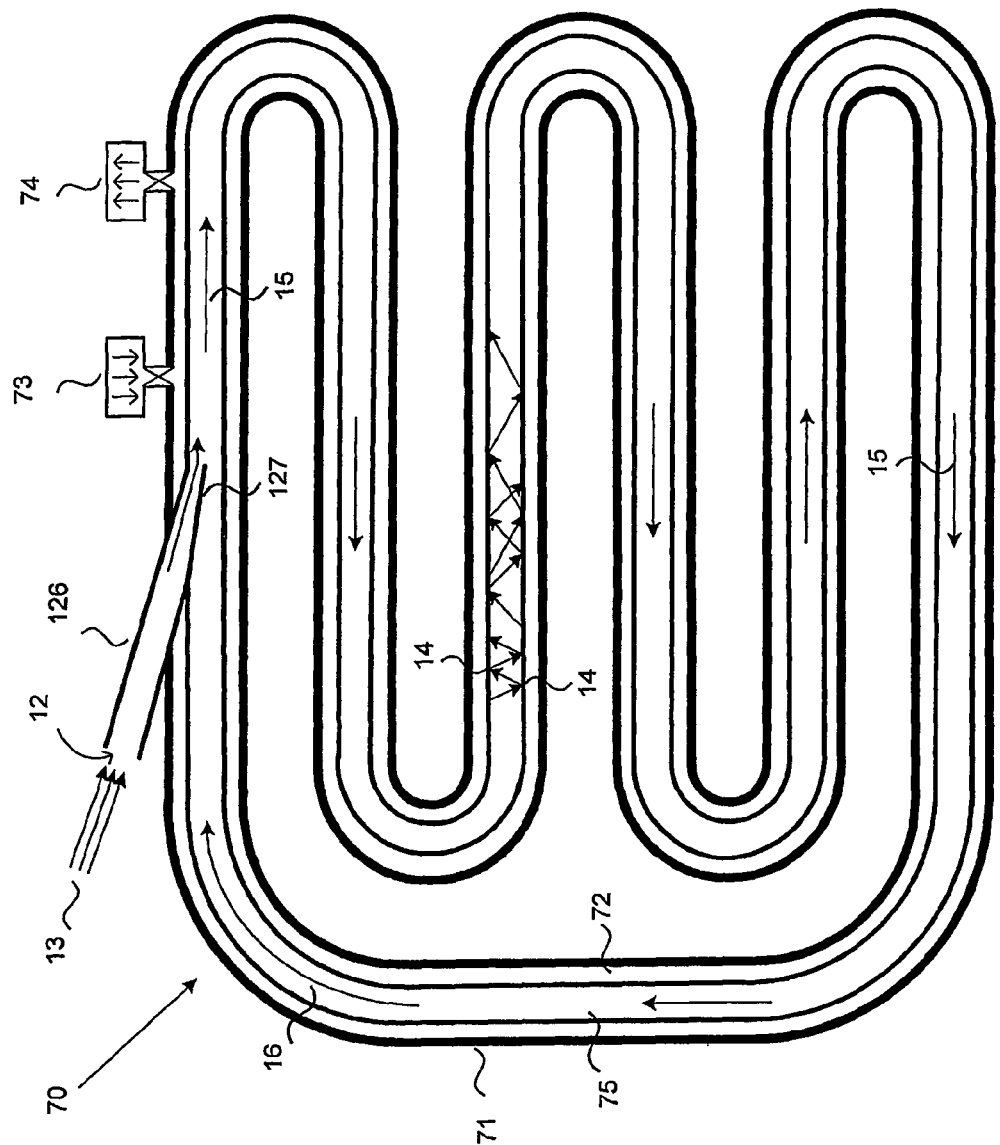
FIG. 7 is a schematic cross-sectional diagram of a second embodiment of a solar energy trap according to the invention.
Figure 8:
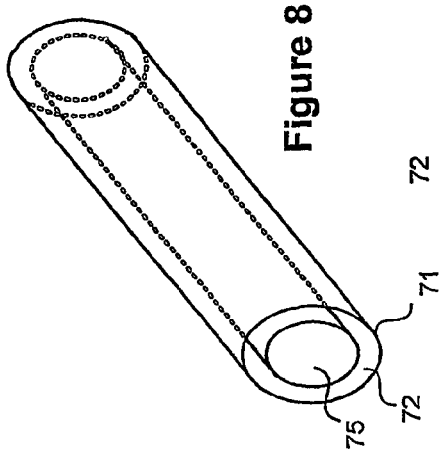
FIG. 8 is a perspective view of a tubular section of the solar energy trap of FIG. 7, having a circular transverse cross-section.
Figure 9:
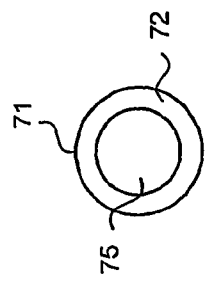
FIG. 9 is a transverse cross-sectional view of a tubular section of the solar energy trap of FIG. 7.

A second embodiment of the invention is illustrated in FIGS. 7 to 9. As best shown in FIG. 7, the second embodiment 70 is similar to the first embodiment, except that the closed chamber is double walled to form an external coaxial jacket. Liquid may be circulated in a space 72 between the chamber 75 and an outer wall 71 of the chamber to minimise temperature variations and prevent hotspots forming. A safety pressure relief valve, not shown, may be in communication with the circulating liquid. Cooling liquid may be introduced into the space 72 through an inlet valve 73 and heated liquid or vapour withdrawn through an outlet valve 74. Thus heat energy may be withdrawn from the solar trap. Moreover, or alternatively, the closed chamber may be enclosed in a pressurised vessel to generate high-grade steam. Such high-grade steam may be used to drive one or more electric generators.

Figure 10:
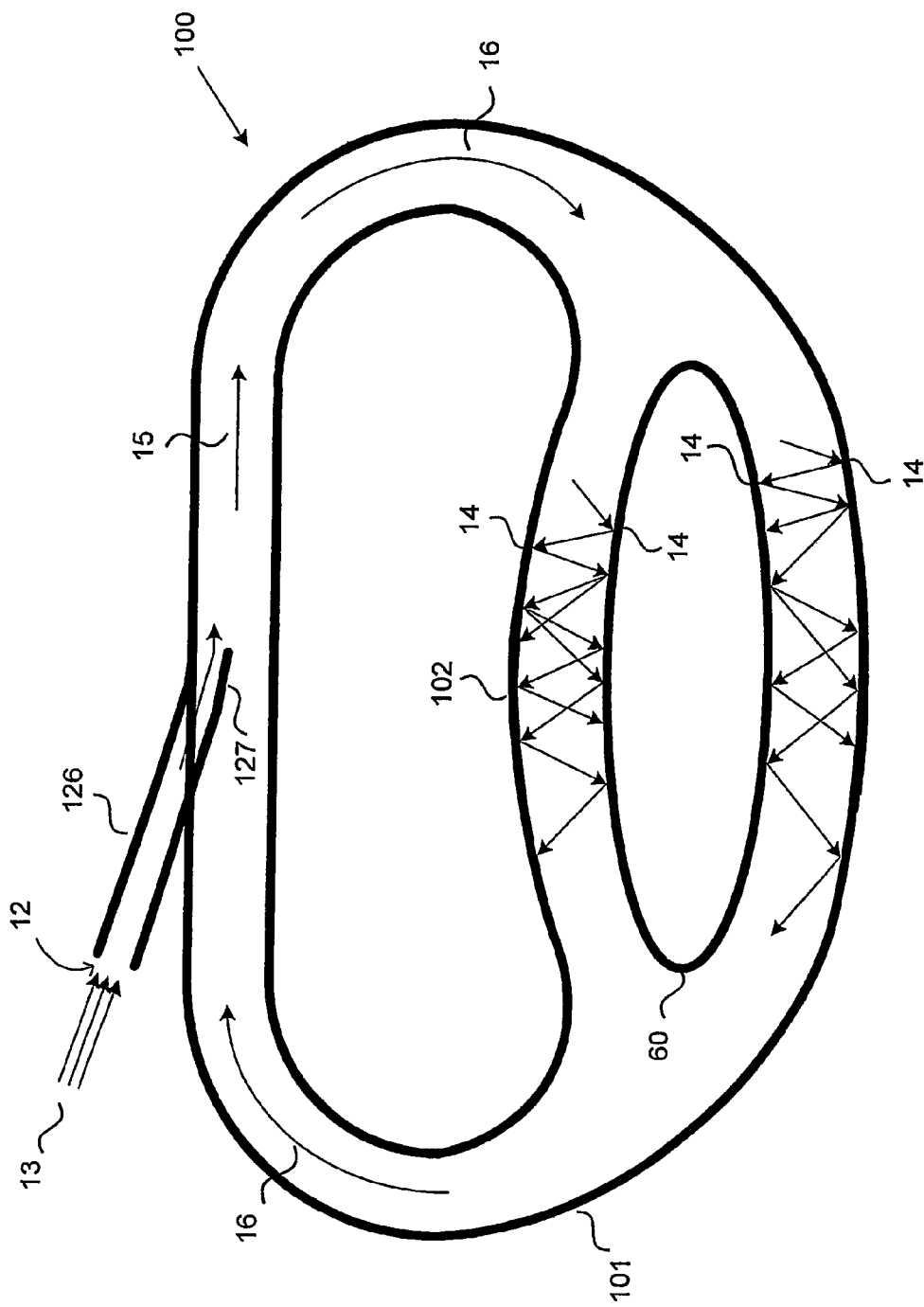
FIG. 10 is a schematic cross-sectional diagram of a third embodiment of a solar energy trap according to the invention.

As shown in FIG. 10, a further embodiment 100 of the invention, having a generally annular chamber 101, with an enlarged transverse cross-section portion 102 enclosing an incineration vessel 60 for containing material to be heated, may be used for incineration, for example of harmful substances, or for cremation, to avoid the use of fossil fuels. A gas handling system, not shown, may provide an inert gas to be used inside the chamber to prevent oxidation from circulating air inside the chamber. During incineration above a threshold temperature, ionised plasma will be formed, from which it may be possible to extract direct current electricity. It will be understood that an incineration vessel may be included in other shapes of chamber, provided substantially all admitted solar energy is absorbed within the chamber.

The closed chamber may be constructed of, for example, metals, metal alloys, or ceramics or a combination of such materials. A working temperature of the solar energy trap will depend upon an application for which the solar energy trap is used. For incineration at high pressures, the chamber may be formed of titanium-tungsten with a high-temperature ceramics internal lining. In the embodiment shown in FIG. 10, the annular chamber 101 may be formed of titanium-tungsten with a high-temperature ceramic internal lining and the incineration vessel 60 formed from titanium-tungsten with a high-temperature ceramic external lining. The incineration vessel 60 is preferably provided with temperature and pressure controls, not shown.

Two small-scale examples of solar energy traps according to the invention have been built. In a first example with an air-cooled aluminium pipe chamber, the aluminium pipe melted. In a second example, in which the chamber was immersed in water, the temperature of the water was raised to boiling point.

The invention claimed is:

1. A method comprising the steps of:
  a. providing a chamber defining an internal volume, wherein the chamber comprises a plurality of elongate portions joined serially at alternate ends to neighbouring elongate portions by semicircular portions, a first of the plurality of elongate portions being joined to a serially last of the elongate portions by a U-shaped portion, to form a re-circulating chamber means, wherein the chamber is double walled to form an external coaxial jacket;
  b. providing an inlet port communicating with the internal volume, wherein the inlet port comprises an inlet tube communicating with the internal volume and a longitudinal axis of the inlet tube is inclined at an acute internal angle to a longitudinal axis of an elongate portion of the chamber means;
  c. admitting solar energy through the inlet port into the internal volume such that the entering solar energy is absorbed and repeatedly reflected within the chamber until substantially all the entering solar energy is absorbed by the chamber;
  d. providing means for absorbing photons entering the chamber.

2. The method as claimed in claim 1, wherein the step of admitting solar energy through the inlet port comprises the step of causing photons of the solar energy entering the chamber to circulate substantially in a single direction within the chamber until absorbed, such that on re-passing the inlet port substantially no photons emerge from the entry port.

3. The method as claimed in claim 1, wherein the step for providing means for absorbing photons further comprises providing photovoltaic cell means located on internal walls of the chamber and converting at least some of the solar energy to electricity therewith.

4. The method as claimed in claim 1, wherein the step for providing means for absorbing photons further comprises providing thermovoltaic cell means located on internal walls of the chamber and converting at least some of the solar energy to electricity therewith.

5. The method as claimed in claim 3, including the further steps of providing temperature control and thereby maintaining a predetermined temperature differential across at least one of either the photovoltaic cell means and the thermovoltaic cell means for substantially maximum working efficiency thereof.

6. The method as claimed in claim 1, further comprising the steps of providing a heat exchanger and extracting heat energy from the chamber therewith.

7. The method as claimed in claim 6, comprising the further steps of providing a pressurised vessel enclosing the chamber and of generating high-grade steam therein.

8. The method as claimed in claim 7, comprising the further steps of providing an electric generator and of using the high-grade steam for generating electricity thereby.

9. The method as claimed in claim 1, including a further comprising the step of incinerating waste material with the trapped solar energy.

10. The method as claimed in claim 1, including a further comprising the step of cremating bodies with the trapped solar energy.

11. The method as claimed in claim 1, further comprising the step of providing gas handling means and providing an inert gas environment within the chamber therewith.

12. The method as claimed in claim 1, further comprising the step of providing water between an outer wall of the chamber and an inner wall of the coaxial external jacket.

* * * * *